Figure 1:
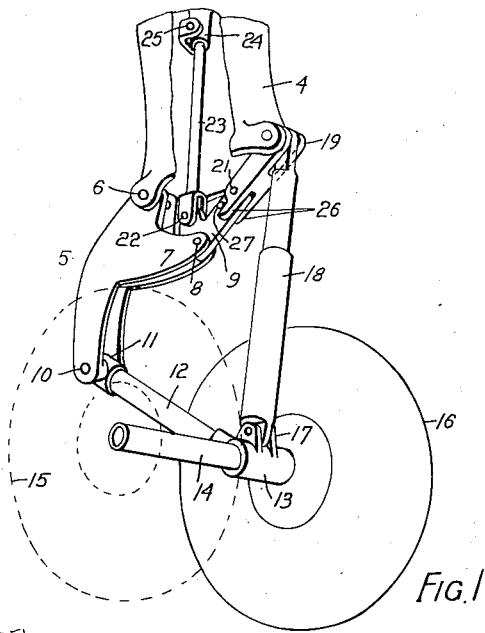

May 31, 1949.  A. E. J. BISHOP  2,471,603
RETRACTABLE MOUNTING AND LOCKING DEVICE
FOR THE WHEELS OF AIRCRAFT
Filed Oct. 17, 1945

Inventor:
Arthur E. J. Bishop
by his Attorneys
Howson & Howson

Patented May 31, 1949

2,471,603

UNITED STATES PATENT OFFICE 2,471,603

RETRACTABLE MOUNTING AND LOCKING DEVICE FOR THE WHEELS OF AIRCRAFT

Arthur Ernest Joseph Bishop, Alexandria, near Sydney, New South Wales, Australia, assignor to National Motor Springs Pty. Limited, Alexandria, near Sydney, New South Wales, Australia, a company of New South Wales Application October 17, 1945, Serial No. 623,156
In Australia October 13, 1944

3 Claims. (Cl. 244—102)

This invention has been devised to provide a mounting for the wheels of aircraft which will support a wheel in running position and which with actuating mechanism will retract the wheel and hold it in retracted position. The invention is applicable to castor wheels or non-swivel wheels either single or duplex or wheels equipped with directional control mechanism.

A feature of the invention is that it permits of the wheel being retracted to a position above the plane of the base of the wheel pillar by movement in an arcuate course which exceeds the radius of the wheel only by the normal working clearance between the wheel and the base of the wheel pillar. The overall dimensions of the mounting are such that in the retracted position the wheel and the mounting will easily fit between the frames of the aircraft structure.

This retractible mounting consists of a wheel base or pillar affixed to the aircraft structure and three arms one of which is or incorporates a shock absorber. The first or fore arm is pivoted to the forward part of the pillar or to a sleeve on the pillar and in wheel running position extends forwardly and downwardly at an oblique angle. The second or drag arm is pivoted to the first arm at the outer end and in running position it extends rearwardly and downwardly at an oblique angle. This second arm which may be a forked arm carries the wheel axle with a wheel or wheels thereon at or near the bottom end. The third or rear arm may also consist of two members each of which is or incorporates the shock absorber; said rear arm or arms is or are pivoted to the bottom of the second arm or arms and to the rear part of the pillar or to a sleeve on the pillar. The wheel axle may be fixed to the third arm in place of the fixture to the second arm mentioned above. The assembled arms constitute what is termed herein an articulated frame of substantially quadrilateral configuration.

Means are provided to lock the first arm relative to the pillar and so hold the articulated frame in the position described in the preceding paragraph which is the wheel running position. The drag arm is of course free to move about its pivot to the fore arm in running position as permitted by the shock absorber in accordance with the load applied to the wheel. The said means with an actuating device are arranged to partially rotate the articulated frame about the first and third arm pivots on the pillar to carry the wheel to retracted position and vice versa and to lock the frame by the first arm in such positions.

Figure 2:
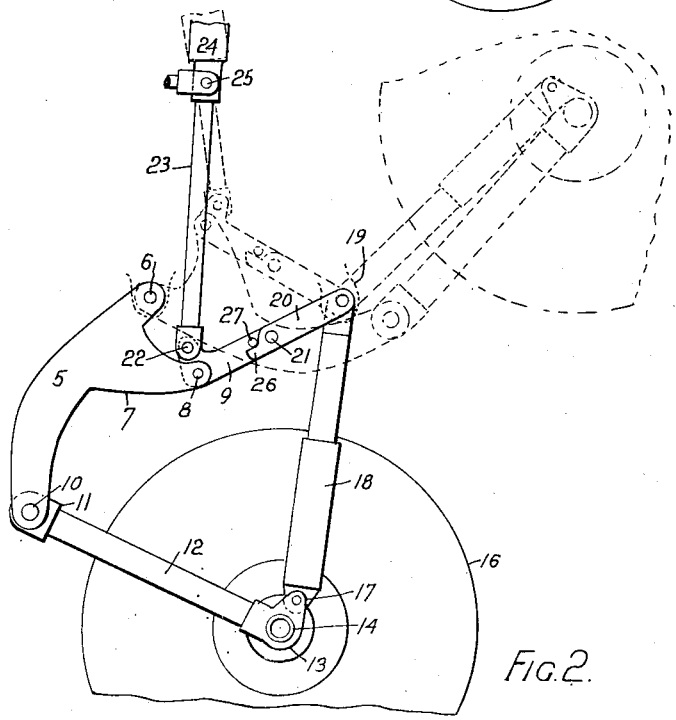

One embodiment of the invention is illustrated in the annexed drawings as applied to a duplex aircraft wheel. Fig. 1 is a perspective view of the articulated frame supporting a wheel in running position; Fig. 2 is a side elevation (one wheel being omitted) showing the wheel in running position and, in dotted outline in the retracted position.

In this embodiment the pillar is indicated at 4 and the articulated frame is shown as being affixed to it. In such fitting where it is desired to provide a swivelling movement in the wheel the pillar is adapted to be rotated about its axis. Alternatively the articulated frame may be affixed to a sleeve or cap on the pillar and where directional control is desired means are provided to rotate the sleeve or cap.

The first or fore arm 5 is a forked arcuate member which is pivoted at 6 to the forward part of the pillar 4. Slightly below and rearwardly of this pivot 6—when in running position—there is a forked bracket 7 incorporating a second pivot pin 8 for one link 9 of a toggle mechanism. At the other end this arm 5 has a pivot 10 to which is fixed the head end 11 of an arm 12 (the second or drag arm). The end 13 of this arm 12 is a mounting for the axle 14 of wheels 15—16 and said mounting also has a pivot bracket 17 for a telescopic shock absorber member 18 which constitutes the third arm. At the top end this shock absorber member is pivotally mounted in bracket 19 on the rear part of the pillar 4. The assembled arms with the pillar base constitute the articulated frame. The other link 20 of the toggle mechanism is pivotally mounted in the bracket 19 and this link 20 is pivoted to the link 9 as at 21.

Link 9 of the toggle mechanism has above the pivot pin 8 a pivot bearing 22 for the plunger rod 23 of a hydraulic mechanism having a cylinder 24 pivotally mounted as at 25 in the pillar 4. Link 20 of the toggle mechanism has a forked end with tongues 26 which project onto the link 9; they are adapted to abut a pin 27 on the link 9 and so restrict movement of the toggle, from in-line position, in one direction.

The positioning of the several pivots is such that when the wheel is moved to running position by a downward thrust of the rod 23 the toggle links 9 and 20 are in line. The tongues 26 abut the pin 27 and so prevent the toggle moving beyond the in-line position in the direction of thrust of the rod 23.

In this position the toggle locks the arm 5 against rearward movement and consequently holds the articulated frame and the wheel in running position.

To retract the wheel the rod 23 is moved upwardly; this movement causes the toggle to move out of the in-line position and the articulated frame and the wheel are moved to the retracted position by the rod 23 pulling upwardly on its bearing 22. When the wheel reaches retracted position the toggle links are again in-line and they lock the wheel retracted until the toggle is again collapsed by a downward thrust of the rod 23. By reference to Fig. 2 it will be seen that the line of thrust and pull of the rod 23 at the commencement of the lowering and retracting operations respectively is to that side of the pivot 8 as will produce the unlocking action of the toggle.

The articulated frame may be designed as a central structure to fit between duplex wheels as illustrated in the drawings or as a forked structure to fit over a single wheel and in either construction it may have links attached to it for the purpose of actuating a fairing covering the hatch wherein the wheel is housed when in the retracted position.

I claim:

1. An articulated frame mounting for the wheels of aircraft comprising a pillar, an arcuate forearm member having a relatively deep base portion pivotally connected to the pillar and arranged in the wheel-running position to project forwardly and downwardly at an oblique angle to the pillar, a drag arm having its head end pivoted to the outer end of the arcuate forearm and declining rearwardly and supporting a wheel axle at its lower end, a rear arm comprising two members providing a telescoping shock absorber pivoted to the lower end of the drag arm and pivotally connected at its upper end to the rear of the pillar, a toggle mechanism comprising a pair of links pivotally connected respectively to the base of the forearm member and the pillar, said toggle mechanism being actuable to lock the forearm relative to the pillar and retain the frame in projected wheel-running and retracted wheel positions respectively, a stop on said toggle limiting movement thereof from an in-line position in one direction, and means to actuate said toggle and move the frame from wheel-running to wheel retracted positions.

2. An articulated frame mounting for the wheels of aircraft comprising a pillar, a forearm pivotally connected to the pillar and arranged in the wheel-running position of the frame to project forwardly and downwardly at an oblique angle to the pillar, a drag arm pivoted to the outer end of the forearm and declining rearwardly therefrom and supporting a wheel axle at its lower end, a rear member incorporating telescoping shock absorber means pivoted to the lower end of the drag arm and to the rear of said pillar, and means acting intermediate said forearm and pillar actuable to lock the forearm relative to the pillar and thereby secure the frame in wheel-running position, said means consisting of a toggle mechanism comprising a pair of links pivoted together and to the forearm and to the pillar, and stop means associated with said links to limit movement of the toggle mechanism from an in-line position in one direction and one of the links having a connection to effect movement of the frame.

3. An articulated frame mounting for the wheels of aircraft comprising a pillar, a forearm pivotally connected to the pillar and arranged in the wheel-running position of the frame to project forwardly and downwardly at an oblique angle to the pillar, a drag arm pivoted to the outer end of the forearm and declining rearwardly therefrom and supporting a wheel axle at its lower end, a rear arm incorporating a telescoping shock absorber pivoted to the lower end of the drag arm and to the rear of said pillar, mechanism to actuate said frame relative to said pillar between projected wheel-running position and retracted wheel position including means operable to lock the forearm relative to the pillar in said projected and retracted positions of the frame consisting of a toggle mechanism comprising a pair of links pivoted together and to the forearm and to the pillar, said links having stop means associated therewith to limit movement of the toggle mechanism from an in-line position in one direction and one of the links having a connection to the actuating mechanism for effecting movement of the frame between said projected and retracted wheel positions.

ARTHUR ERNEST JOSEPH BISHOP.

REFERENCES CITED

The following references are of record in the file of this patent:

UNITED STATES PATENTS

| Number | Name | Date |
| --- | --- | --- |
| 2,272,699 | Gladden | Feb. 10, 1942 |

FOREIGN PATENTS

| Number | Country | Date |
| --- | --- | --- |
| 307,099 | Germany | June 26, 1919 |
| 717,218 | France | Oct. 19, 1931 |